3,652,628
CYCLOTETRASILOXANES WHICH IMPART ALTERATION OF GENITAL FUNCTION IN MAMMALS
James Franklin Hyde and David E. Spielvogel, Midland, Mich., assignors to Dow Corning Corporation, Midland, Mich.
No Drawing. Filed July 7, 1969, Ser. No. 839,696
Int. Cl. C07f 7/08, 7/20
U.S. Cl. 260—448.2 R     1 Claim

ABSTRACT OF THE DISCLOSURE

Certain phenyl and methyl containing cyclotetrasiloxane compounds which exhibit androgen depressant effects. For example, by orally administering a cyclotetrasiloxane of the formula

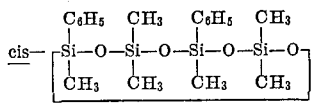

it has been shown that one can alter the genital function (which includes reproductive capacity as well as androgenic and estrogenic capacity) of mammals.

---

This invention relates to certain cyclotetrasiloxane compounds and more specifically to certain phenyl- and methyl-containing cyclotetrasiloxane compounds which can be employed to alter the genital function of mammals. More precisely, a male mammal treated with these certain cyclotetrasiloxane compounds exhibit androgen depressant effects. For example, the sex accessory organs of the male (seminal vesicle, prostate) can be reduced in function and/or size and with sufficient dosage, the male can also be rendered sterile as a result of depression of tests function. A female mammal so treated exhibits an alteration of fertility, i.e., the female mammal's capability to conceive is either enhanced with small doses or inhibited with larger doses such that the female may be rendered sterile or abort if pregnant.

In addition to the above, these certain cyclotetrasiloxane compounds can also be useful as precursors to produce other useful materials, e.g., lubricants, elastomers, and the like.

This invention relates to certain cyclotetrasiloxanes, said cyclotetrasiloxanes being selected from the group consisting of

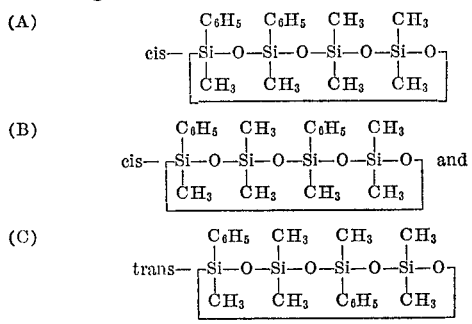

The cyclotetrasiloxanes can be readily prepared by the reaction of the appropriate polysiloxanediol with a halogenated (exclusive of fluorine) silane or halogenated end-blocked (exclusive of fluorine) polysiloxane in the presence of a suitable solvent such as commercially available hydrocarbon solvents, ethers, etc. and an acid acceptor. Suitable acid acceptors include triethylamine, pyridine, α-picoline and the like. A precipitate of acid-acceptor and H-halogen salt is obtained and filtered after which the cyclic solution is washed (one or more times) with water to remove residual salt. The cyclic mixture is then concentrated by solvent removal and the desired cyclotetrasiloxanes are isolated by distillation or fractional crystallization.

Preparation of the cyclotetrasiloxanes in question may be best illustrated as follows:

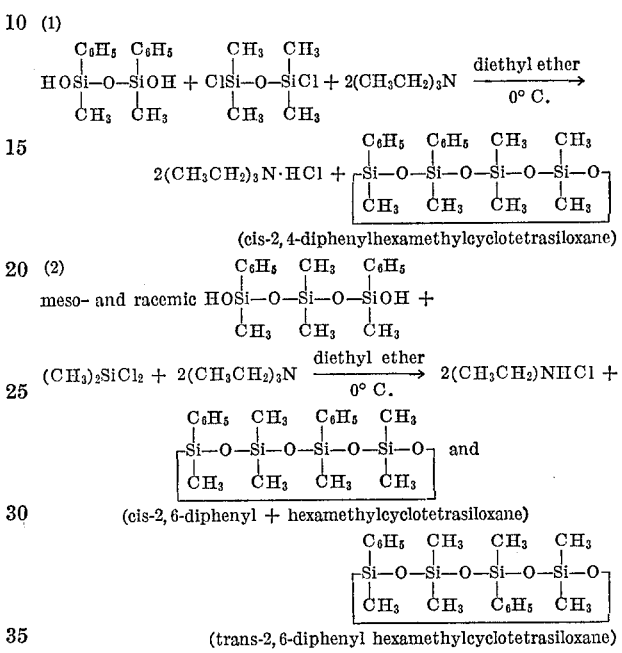

The stereisomeric cyclotetrasiloxane compounds may also be prepared by alkaline equilibration of polydimethylcyclosiloxane and polyphenylmethylcyclosiloxane species in a suitable solvent such as commercially available hydrocarbons, aromatic hydrocarbons and the like to provide a mixture of all of the possible isomeric species. The resultant mixture is then separated by distillation into various fractions so as to obtain the individual isomers which have been described herein.

The particular alteration of androgenic functions which have been observed after administering the certain cyclotetrasiloxanes of the present invention in a pharmacologically acceptable manner and in a pharmacologically effective amount to male mammals, e.g., rodents, cats, swine, dogs, cattle, deer, fox and primates (monkeys and man) are an increase in sex accessory organ function (increased seminal fluid) and size (increased seminal vesicle) with smaller doses of the compounds and/or a decrease in sex accessory organ function (decreased seminal fluid) and size (decreased seminal vesicle) and a decrease in testicular function (decreased sperm count) or size with larger doses.

In view of the above, the method of this invention can be useful for increasing or decreasing the size of male sex accessory organs. In this regard, sex accessory organs are more sensitive than the testes to these certain cyclotetrasiloxane compounds so that it is possible to decrease prostatic function and size without producing a significant effect on testicular size.

It is also possible to prevent pregnancy (contraception) or abort pregnancy in female mammals because of an estrogenic depressant activity of the certain cyclotetrasiloxanes described herein. In certain circumstances the compounds can also be useful in enhancing fertility because they possess an estrogenic action.

Details regarding mode of administration, dosage, and the like of the certain cyclotetrasiloxanes to obtain the pharmacological actions described herein can be found in U.S. application, Ser. No. 743,062, filed July 10, 1968.

It is to be noted that in all of the foregoing cases, the described pharmacological actions are reversible.

The following examples are illustrative only and should not be construed as limiting the invention which is properly delineated in the appended claims.

EXAMPLE 1

To a one-liter, three-necked flask equipped with an addition funnel, mechanical stirrer, and a condenser fitted with a CaSO$_4$ drying tube, 36.2 grams (0.125 mole) of a compound of the formula

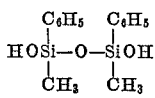

25.2 grams (0.250 mole) of (CH$_3$CH$_2$)$_3$N, and 355 grams of diethyl ether were mixed and cooled to 0° C. with the use of an external ice bath. A solution of 25.4 grams (0.125 mole) of

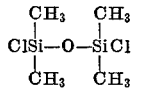

in diethyl ether was added over a period of two hours, with continued stirring for an additional 30 minutes. The product and (CH$_3$CH$_2$)$_3$N·HCl mixture was filtered to remove (CH$_3$CH$_2$)$_3$N·HCl. The solution of product and ether was washed three times with water (200 grams) and separated. Diethyl ether was removed under reduced pressure (10–20 mm. Hg) giving a concentrate which weighed 42.9 grams (theory 52.5 grams). This material was distilled under vacuum to provide 30.4 grams (70 percent) of

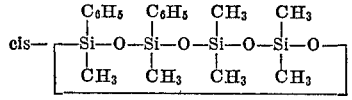

$n_D^{25}$ =1.4874, boiling point 162° at 0.8 mm.

The n.m.r. gave absorptions at 9.99 tau (CH$_3^{(a)}$, 6.0 protons), 9.82 tau (CH$_3^{(b)}$, 6.0 protons), 9.61 tau (CH$_3^{(c)}$, 6.0 protons), 2.3–2.9 tau (10 protons).

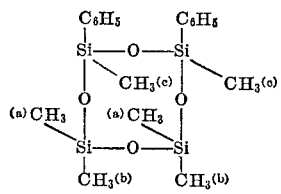

Infrared spectrum agrees with the proposed structure. Typical cyclotetrasiloxane absorption @ 1075 cm.$^{-1}$; (CH$_3$)$_2$Si— 805 cm.$^{-1}$; CH$_3$Si— 790 cm.$^{-1}$; O—Si— 1430 cm.$^{-1}$; and 1125 cm.$^{-1}$.

The compound was also identified and confirmed via a gas-liquid-chromatogram analysis.

EXAMPLE 2

To a one-liter, three-necked flask equipped with an addition funnel, mechanical stirrer, and a condenser fitted with a CaSO$_4$ drying tube, 45.5 grams (0.125 mole) of a meso and racemic compound of the formula

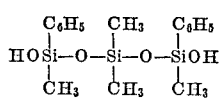

and 25.0 grams (0.250 mole) of (CH$_3$CH$_2$)$_3$N and 355 grams of diethyl ether were mixed and cooled to 0° C. with the use of an external ice bath. A solution of 16.1 grams (0.125 mole) (CH$_3$)$_2$SiCl$_2$ was added over a period of two hours. After standing for eighteen hours the product and (CH$_3$CH$_2$)$_3$N·HCl mixture was filtered to remove (CH$_3$CH$_2$)$_3$N·HCl. The ether solution was washed three times with water (200 grams) and separated. Removal of diethyl ether under reduced pressure (10–20 mm. Hg) yielded a product which weighed 52.0 grams (Theory 52.5 grams). This material was distilled under vacuum to provide 30.2 grams (58 percent) of

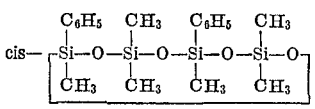

and $n_D^{25}$=1.4868; M.P. 41° C. (4° C./min.)

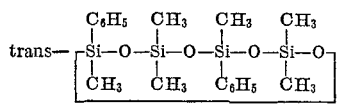

M.P. 55° C. (4° C./min.)

The n.m.r. gave absorptions at 10.0 tau (CH$_3^{(a)}$, 6.0 protons), 9.78 tau (CH$_3^{(b)}$, 6.0 protons), 9.66 tau (CH$_3^{(c)}$, 6.0 protons), and 9.87 tau (CH$_3^{(a)}$, 12 protons), 9.74 tau (CH$_3^{(b)}$, 6.0 protons).

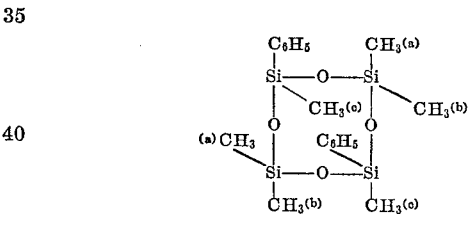

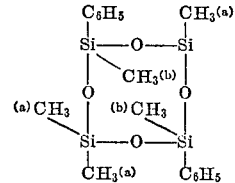

The compounds were also identified and confirmed via gas-liquid-chromatogram analysis.

EXAMPLE 3

To a one-liter, three-necked, round-bottomed flask fitted with a Dean-Stark trap-condenser, mechanical stirrer and thermometer were added 90 grams (0.165 mole) of tetraphenyltetramethylcyclotetrasiloxane, 65 grams (0.22 mole) octamethylcyclotetrasiloxane, and 393 grams of toluene. The resulting sample was catalyzed with 0.396 gram of a 45 wt. percent KOH solution (in H$_2$O; K/Si ratio=1/485). The sample was then heated to reflux until H$_2$O ceased to be evolved, followed by heating for an additional six hours. The solution was adjusted to an acid number of 0.01 with (CH$_3$)$_2$SiCl$_2$ and filtered to remove KCl that had formed. Toluene was removed under reduced pressure (30° at 1–2 mm.) providing a concentrate which weighed 146.7 grams (Theory 155 grams). This material was strip-distilled under vacuum to give 103.3 grams (70 percent) of

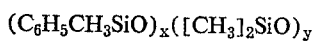

copolymer cyclosiloxanes B.P. range 77°–145° at .02 mm. Distribution of cyclics was determined by gas-liquid-chromatography:

| x | y | Area percent |
|---|---|---|
| 1 | 3 | 9 |
| 1 | 4 | 4 |
| 2 | 1 | |
| 1 | 5 | 2 |
| 2 | 2 | 22 |
| 1 | 6 | 1 |
| 2 | 3 | 15 |
| Higher retention time cyclics | | 47 |

The mixture described above was then fractionally distilled by means of standard techniques so that individual fractions could be obtained.

To a one-half gallon bottle were combined a mixture of one of the above noted fractions, namely 1000 grams of $(C_6H_5CH_3SiO)_2[(CH_3)_2SiO]_2$ and 500 grams of MeOH. The sample was cooled to −20° C. and seeded with crystals of cis-2,6-diphenylhexamethylcyclotetrasiloxane; after 40 hrs. at −20° a crop of crystals was obtained which after filtration and washing with cold MeOH (−20°) weighed 16.4 grams. Analysis of the material by gas-liquid-chromatography indicated only cis-2,6-diphenylhexamethylcyclotetrasiloxane present. M.P. of the material is 40.5–41° C.

EXAMPLE 4

The present example illustrates the androgen-depressant activity of the isomers of a certain cyclotetrasiloxane compound in the male rat.

Five groups of male rats (Sherman-strain) were utilized. The first group served as a control and received only sesame oil. The second group received 2,4-cis-diphenylhexamethylcyclosiloxane at a daily dose level of 33 mg./kg. of body weight. The third group received 2,6-trans-diphenylhexamethylcyclosiloxane at the same dose level. Groups four and five received 2,6-cis-diphenylhexamethylcyclosiloxane at 1.0 and 10 mg./kg. of body weight respectively. The animals were dosed daily for a period of 7 days. There were 10 animals per group and the animals were autopsied on day eight and the seminal vesicle was emptied of seminal fluid and weighed and that weight was expressed as a ratio to final body weight.

Table I (below) is indicative of the results which were obtained. It is to be noted that the 2,6-cis-diphenylhexamethylcyclosiloxane is active at the doses listed and that the other isomers are inactive at 33 mg./kg. of body weight, when higher dose levels are employed for the other isomers, e.g., 100 mg./kg. of body weight; however, equivalent results are obtained.

TABLE I

Androgen-Depressant Activity of a Certain Tetracyclosiloxane Compound in the Male Rat

| Group | Dose,[1] mg./kg. | Mean seminal vesicle ratio [2] ±S.E.$_{\bar{x}}$ as percent of control |
|---|---|---|
| Control (sesame oil) | | 100 |
| 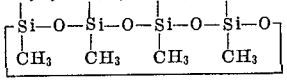 (2,4-cis-diphenylhexamethylcylosiloxane) | 33 | 110 |
| 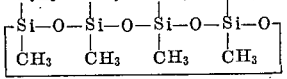 (2,6-trans-diphenylhexamethylcyclosiloxane) | 33 | 101 |
| 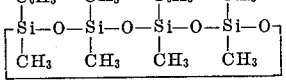 (2,6-cis-diphenylhexamethylcyclosiloxane) | 1 | [3] 80 |
| (2,6-cis-diphenylhexamethylcyclosiloxane) | 10 | [3] 71 |

[1] Compound administered in sesame oil orally daily at dose listed for 7 days with autopsy on day 8. Ten animals per group.
[2] Ratio equals organ weight/final body weight.
[3] p<.001 compared to control.

That which is claimed is:
1. A cyclotetrasiloxane of the formula

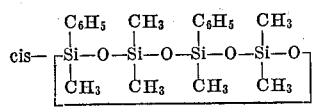

References Cited

Andrianov et al.: "Chemical Abstracts," 58, p. 22437c, 1960.

DELBERT E. GANTZ, Primary Examiner

P. F. SHAVER, Assistant Engineer

U.S. Cl. X.R.

260—448.2 E; 424—184, Dig 12, Dig 14